(12) United States Patent
Kurimoto et al.

(10) Patent No.: US 10,597,480 B2
(45) Date of Patent: Mar. 24, 2020

(54) LAMINATE FILM

(71) Applicants: HITACHI CHEMICAL COMPANY, LTD., Chiyoda-ku, Tokyo (JP); ZEON CORPORATION, Chiyoda-ku, Tokyo (JP)

(72) Inventors: Shigeru Kurimoto, Tokyo (JP); Hidekazu Kondou, Tokyo (JP); Kazuo Aizu, Tokyo (JP); Yasunori Ii, Chiyoda-ku (JP)

(73) Assignees: Hitachi Chemical Co., Ltd., Tokyo (JP); Zeon Corporation, Tokyo (JP)

( * ) Notice: Subject to any disclaimer, the term of this patent is extended or adjusted under 35 U.S.C. 154(b) by 98 days.

(21) Appl. No.: 15/326,943

(22) PCT Filed: Jul. 16, 2015

(86) PCT No.: PCT/JP2015/070420
§ 371 (c)(1),
(2) Date: Jan. 17, 2017

(87) PCT Pub. No.: WO2016/010115
PCT Pub. Date: Jan. 21, 2016

(65) Prior Publication Data
US 2017/0204215 A1    Jul. 20, 2017

(30) Foreign Application Priority Data
Jul. 18, 2014   (JP) .................................. 2014-148185

(51) Int. Cl.
*C08F 290/12* (2006.01)
*B32B 27/18* (2006.01)
(Continued)

(52) U.S. Cl.
CPC ............ *C08F 290/126* (2013.01); *B32B 7/02* (2013.01); *B32B 7/04* (2013.01); *B32B 7/12* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2006/0141243 A1* | 6/2006 | Ibuki | B32B 7/02 428/334 |
| 2007/0127130 A1* | 6/2007 | Ushino | G02B 5/3083 359/625 |

(Continued)

FOREIGN PATENT DOCUMENTS

| | | |
|---|---|---|
| CN | 101285958 | 10/2008 |
| CN | 102272676 | 12/2011 |

(Continued)

OTHER PUBLICATIONS

The Office Action issued in Chinese patent application No. 201580029879.5, dated Nov. 14, 2017.

(Continued)

*Primary Examiner* — Anthony J Frost
(74) *Attorney, Agent, or Firm* — Seyfarth Shaw LLP

(57) ABSTRACT

A laminate film comprising a substrate film and a cured film that is a cured curable composition disposed on one surface or both surfaces of the substrate film is disclosed. The substrate film is a film containing a cyclic olefin resin, and the curable resin composition comprises: (A) an acrylic resin having a polymerizable double bond; (B) a multifunctional polymerizable compound having three or more polymerizable double bonds, and having one or more monovalent (Continued)

groups represented by the following formula (2-1) or (2-2) as a group containing the polymerizable double bond; and (C) an alkylene oxide modified bisphenol A di(meth)acrylate.

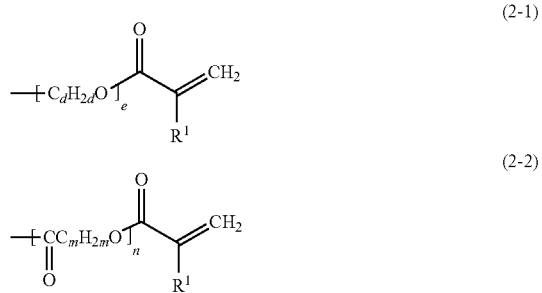

(2-1)

(2-2)

16 Claims, 2 Drawing Sheets (51) Int. Cl.
```
B32B 27/32      (2006.01)
G02F 1/1335     (2006.01)
B32B 27/30      (2006.01)
C09J 151/08     (2006.01)
B32B 27/06      (2006.01)
B32B 27/08      (2006.01)
B32B 23/08      (2006.01)
B32B 23/20      (2006.01)
B32B 27/16      (2006.01)
B32B 7/04       (2019.01)
C08J 7/04       (2020.01)
B32B 7/02       (2019.01)
B32B 7/12       (2006.01)
G02F 1/1343     (2006.01)
```
(52) U.S. Cl.
CPC .............. *B32B 23/08* (2013.01); *B32B 23/20* (2013.01); *B32B 27/06* (2013.01); *B32B 27/08* (2013.01); *B32B 27/16* (2013.01); *B32B 27/18* (2013.01); *B32B 27/30* (2013.01); *B32B 27/306* (2013.01); *B32B 27/308* (2013.01); *B32B 27/32* (2013.01); *B32B 27/325* (2013.01); *C08J 7/0427* (2020.01); *C09J 151/08* (2013.01); *G02F 1/1335* (2013.01); *G02F 1/133528* (2013.01); *G02F 1/134363* (2013.01); *B32B 2250/03* (2013.01); *B32B 2250/05* (2013.01); *B32B 2250/24* (2013.01); *B32B 2255/10* (2013.01); *B32B 2255/20* (2013.01); *B32B 2255/26* (2013.01); *B32B 2307/306* (2013.01); *B32B 2307/40* (2013.01); *B32B 2307/412* (2013.01); *B32B 2307/418* (2013.01); *B32B 2307/42* (2013.01); *B32B 2307/536* (2013.01); *B32B 2307/546* (2013.01); *B32B 2307/56* (2013.01); *B32B 2307/584* (2013.01); *B32B 2307/708* (2013.01); *B32B 2307/71* (2013.01); *B32B 2307/732* (2013.01); *B32B 2307/734* (2013.01); *B32B 2307/746* (2013.01); *B32B 2457/202* (2013.01); *B32B 2457/208* (2013.01); *C08J 2323/20* (2013.01); *C08J 2351/06* (2013.01); *C08J 2433/10* (2013.01); *G02F 2201/086* (2013.01); *G02F 2201/50* (2013.01)

(56) References Cited

U.S. PATENT DOCUMENTS

| | | | |
|---|---|---|---|
| 2007/0207277 A1* | 9/2007 | Mizushima | B29C 55/023 428/1.31 |
| 2008/0057228 A1* | 3/2008 | Horie | G02B 5/0215 428/1.32 |
| 2012/0258296 A1* | 10/2012 | Nimura | G02B 5/3083 428/212 |
| 2013/0040093 A1* | 2/2013 | Horiuchi | C09J 7/40 428/78 |
| 2013/0135763 A1* | 5/2013 | Liao | G03F 7/0757 359/891 |

FOREIGN PATENT DOCUMENTS

| | | |
|---|---|---|
| JP | 2006-337670 | 12/2006 |
| JP | 2008-165041 | 7/2008 |
| JP | 2009-134224 | 6/2009 |
| JP | 2010-120304 | 6/2010 |
| JP | 2011-39165  | 2/2011 |
| JP | 2014-29535  | 2/2014 |

OTHER PUBLICATIONS

The Notification of Transmittal of Copies of Translation of the International Preliminary Report on Patentability issued in International Application No. PCT/JP2015/070420, dated Feb. 2, 2017.

* cited by examiner

LAMINATE FILM

CROSS REFERENCE TO RELATED APPLICATIONS

This application is a U.S. National Stage of PCT International Patent Application Number PCT/JP2015/070420, which was filed on Jul. 16, 2015, which claims priority to Japanese Patent Application No. 2014-148185, which was filed on Jul. 18, 2014, the disclosures of each of which is incorporated herein by reference in its entirety.

TECHNICAL FIELD

The present invention relates to a laminate film having a substrate film and a cured film disposed on one surface or both surfaces of the substrate film.

BACKGROUND ART

Films containing a cyclic olefin resin have high transparency and low water absorbency, and use of the films as a substrate film of a conductive film to constitute a touch panel or the like has been examined.

A technology for forming hard coat layers excellent in scratch resistance from an acrylate having a relatively low molecular weight on both surfaces of a substrate film is also known (e.g. refer to Patent Literature 1).

CITATION LIST

Patent Literature

Patent Literature 1
Japanese Unexamined Patent Publication No. 2008-165041

SUMMARY OF INVENTION

Technical Problem

However, the films containing a cyclic olefin resin have low surface hardness, and scratches or the like occur on the surface in some cases, in a process using the films. Although the formation of a hard coat layer can impart scratch resistance to a certain extent, in this case, cracks easily occur when the film is bent, which has been a problem.

Therefore, a major object of the present invention is to provide a laminate film having a film containing a cyclic olefin resin as a substrate film, excellent in both of scratch resistance and flexibility.

Solution to Problem

The present invention relates to a laminate film comprising a substrate film and a cured film that is a cured curable composition disposed on one surface or both surfaces of the substrate film. The substrate film is a film containing a cyclic olefin resin. The curable resin composition comprises: (A) an acrylic resin having a polymerizable double bond; (B) a multifunctional polymerizable compound having three or more polymerizable double bonds, and having one or more monovalent groups represented by the following formula (2-1) or (2-2) as a group containing the polymerizable double bond; and (C) an alkylene oxide modified bisphenol A di(meth)acrylate represented by the following formula (3). An optional resin layer (film) may be disposed on the surface of the substrate film not provided with the cured film, within a range not substantially impeding the effect of the present invention. The material constituting the resin layer is not particularly limited and any resin such as a cyclic olefin resin and an acrylic resin can be used.

(2-1)

In the formula (2-1), $R^1$ represents a hydrogen atom or a methyl group, d represents an integer of 2 to 4, and e represents an integer of 1 to 6.

(2-2)

In the formula (2-2), $R^1$ represents a hydrogen atom or a methyl group, m is 5, and n represents an integer of 1 to 4.

(3)

In the formula (3), $R^1$ represents a hydrogen atom or a methyl group, f represents an integer of 2 to 5, g and h represent an integer of 1 or more, and g+h is 2 to 40.

When the double bond equivalent is defined by a formula: double bond equivalent=molecular weight/number of polymerizable double bonds in the same molecule, the double bond equivalent of the multifunctional polymerizable compound may be 130 or more and 500 or less. The above multifunctional polymerizable compound is a compound different from the above acrylic resin.

A combination of an acrylic resin having a polymerizable double bond, a trifunctional or more multifunctional polymerizable compound having a (meth)acryloyl group bonded to an oxyalkylene group or the like, and an alkylene oxide modified bisphenol A di(meth)acrylate as polymerizable components enables the scratch resistance and the flexibility of a laminate film having a cyclic olefin resin film as a substrate film to be effectively improved.

The above double bond equivalent of the acrylic resin may be 220 or more and 2500 or less. Both the scratch resistance and the flexibility can be thereby achieved at further higher levels.

The weight average molecular weight of the above acrylic resin may be 5000 or more and 200000 or less. Both the scratch resistance and the flexibility can be thereby achieved at further higher levels.

The double bond equivalent of the multifunctional polymerizable compound may be 130 or more and 300 or less. A better effect on the scratch resistance of the cured film can be thereby obtained.

In the formula (3), f may be 2. Both the scratch resistance and the flexibility can be thereby achieved at further higher levels.

The curable composition may further contain (D) a urethane (meth)acrylate having a urethane group and two or more (meth)acryloyl groups. A better effect on the scratch resistance of the cured film can be thereby obtained.

The curable composition may comprise an acrylic resin in a ratio of 8 parts by mass or more and 40 parts by mass or less, a multifunctional polymerizable compound in a ratio of 40 parts by mass or more and 80 parts by mass or less, an alkylene oxide modified bisphenol A di(meth)acrylate in a ratio of 4 parts by mass or more and 40 parts by mass or less, and a urethane (meth)acrylate in a ratio of 0.5 parts by mass or more and 15 parts by mass or less. Particularly excellent effects on the scratch resistance and the flexibility can be thereby obtained.

In the case of forming a cured film by light irradiation, the curable composition may further comprise (E) a photopolymerization initiator.

The curable composition may comprise (F) fine particles for the adjustment of optical properties such as refractive index or for the enhancement of the anti-blocking properties.

The substrate film may be a stretched film. The substrate film can thereby produce effects of optical properties such as retardation. The stretched film may be an obliquely stretched film. The obliquely stretched film as a substrate film is favorably used, for example, as a ¼ wavelength plate. ¼ wavelength plates need to be laminated on a polarizer, such that the slow axis and the transmission axis of the polarizer intersect at a predetermined angle not in parallel or not perpendicular to each other. Since obliquely stretched films can have a slow axis along a predetermined oblique direction not in parallel or not perpendicular to the width direction, the films can be efficiently laminated on a polarizer or the like by a roll to roll method without need of a cutting process prior to laminating.

The substrate film may be a multi-layer film. The multi-layer film can have, for example, a UV-absorbing intermediate layer. A polarizer and a liquid crystal element can be thereby prevented from being deteriorated by light from outside. In this case, the multi-layer film may further have a surface layer containing no UV absorber, so that a film transport roll and the film in a process can be prevented from being contaminated.

Another aspect of the present invention relates to a liquid crystal display device having a liquid crystal cell, a polarizer, and the above laminate film. The polarizer and the laminate film are stacked in this order on the viewing side of the liquid crystal cell, and the laminate film is stacked such that the substrate film and the cured film are disposed in this order from the liquid crystal side. The liquid crystal cell may be an IPS-mode liquid crystal cell.

Advantageous Effects of Invention

The laminate film of the present invention is excellent in both the scratch resistance and the flexibility. The laminate film of the present invention hardly causes burrs on an edge face when cut, being also excellent in workability. The curable composition of the present invention allows a single layer consisting of organic materials to have sufficient function as a cured film, without need of another film such as a film of inorganic materials. Furthermore, the laminate film of the present invention is excellent also in adhesion between the cyclic olefin resin film and the cured film.

DESCRIPTION OF EMBODIMENTS

The preferred embodiments of the present invention are described in detail as follows. The present invention is not limited to the following embodiments, though. In the present specification, the term "(meth)acryl" means methacryl or acryl. The term "(meth)acrylate" or the like is interpreted in the same manner.

Figure 1:
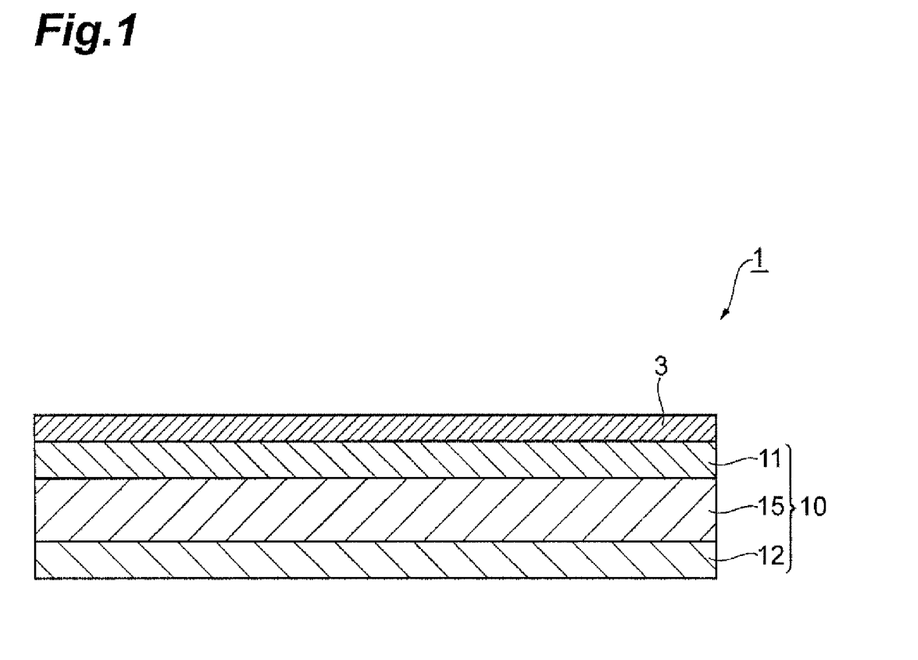
FIG. 1 is a cross-sectional view illustrating an embodiment of a laminate film.

The laminate film of the present invention has a substrate film and a cured film disposed on one surface or both surfaces of the substrate film. The cured film is formed by curing the film of curable composition. The substrate film may be a mono-layer film having one layer only, or a multi-layer film having two or more layers. FIG. 1 is a cross-sectional view illustrating an embodiment of a laminate film. The laminate film 1 illustrated in FIG. 1 is a multi-layer film having a substrate film 10 and a cured film 3 disposed on one surface of the substrate film 10.

The cured film may cover the whole or a part of one surface or both surfaces of the substrate film. Any layer (a primer layer, a barrier layer, etc.) may be disposed between the cured film and the substrate film.

Another layer is stacked on the laminate film on an as needed basis. For example, the laminate film can be used to obtain a transparent conductive film having a transparent conductive layer or a barrier film. In the case of using the present laminate film as a transparent conductive film for a touch panel, for example, a structure having a transparent conductive layer formed directly on the cured layer to constitute the present laminate film, or a structure having a refractive index adjusting layer formed between the cured film and a transparent conductive layer, may be employed. In other words, the present laminate film for use as a transparent conductive film may further have, for example, a barrier layer disposed between the substrate film and the cured film and a transparent conductive layer directly disposed on the cured film. The refractive index adjusting layer may have a single-layer structure or a multi-layer structure. The advantage of forming a refractive index adjusting layer is that a conductive layer pattern can be made less visible. In the case of using the present laminate film as a barrier film, for example, a structure having a barrier layer formed directly on the cured layer to constitute the present laminate film, or a structure having an adhesive layer formed between the cured film and a barrier layer, may be employed. In other words, the present laminate film for use as a barrier film may further have, for example, a barrier layer disposed between the substrate film and the cured film.

Substrate Film

The substrate film is a film comprising a cyclic olefin resin. Specifically, the film comprising a cyclic olefin resin is a molded product of a cyclic olefin resin composition comprising a cyclic olefin resin and additives or the like to be contained on an as needed basis. As illustrated in FIG. 1, the substrate film 10 is a multi-layer film having an intermediate layer 15, a first surface layer 11 stacked on one main surface of the intermediate layer 15, and a second surface layer 12 disposed on another main surface of the intermediate layer 15. Each of these layers may comprise a cyclic olefin resin.

The cyclic olefin resin is a resin known to those skilled in the art, as disclosed in Japanese Unexamined Patent Publication No. H3-14882, Japanese Unexamined Patent Publication No. H3-122137, Japanese Unexamined Patent Publication No. H4-63807, or Japanese Unexamined Patent Publication No. 2002-321302. Specifically, the cyclic olefin resin may be, for example, one or two or more resins selected from a ring-opening polymer of norbornene or a derivative thereof, a hydrogenated additive of the polymer, an addition-type polymer of norbornene or a derivative thereof, an addition-type polymer of norbornene or a derivative thereof and an olefin, a polymer or a copolymer of cyclic olefin having a single ring, a polymer or a copolymer of cyclic conjugated diene, a vinyl alicyclic hydrocarbon polymer (alicyclic acrylic resin), and modified products of these polymers. The norbornene derivative is a compound represented by, for example, the following formula (10).

(10)

In the formula (10), j represents an integer of 0 or more, $R^2$, $R^3$, $R^4$, $R^5$, $R^6$, $R^7$, $R^8$ and $R^9$ each independently represent a hydrogen atom, a halogen atom, or a hydrocarbon group which may be substituted with a halogen atom, $R^{19}$, $R^{11}$, $R^{12}$ and $R^{13}$ each independently represent a hydrogen atom, a halogen atom, or a hydrocarbon group which may be substituted with a halogen atom, or a group represented by $-(CH_2)_k COOR^{21}$, $-(CH_2)_k OCOR^{21}$, $-(CH_2)_k OR^{21}$, $-(CH_2)_k CN$, $-(CH_2)_k CONR^{22}R^{23}$, $-(CH_2)COOZ$, $-(CH_2)OCOZ$, $-(CH_2)_k OZ$, or $-(CH_2)_k W$ represents an integer of 0 to 10, $R^{21}$, $R^{22}$ and $R^{23}$ represent a hydrocarbon group having 1 to 20 carbon atoms, Z represents a hydrocarbon group which may be substituted with a halogen atom, W represents a group represented by $SiOR^{25}_p D_{3-p}$ ($R^{25}$ represents a hydrocarbon group having 1 to 10 carbon atoms, D represents a halogen atom, $-OCOR^{26}$ or $-OR^{26}$ ($R^{26}$ represents a hydrocarbon atom having 1 to 10 carbon atoms), p represents an integer of 0 to 3)). $R^{10}$, $R^{11}$, $R^{12}$ and $R^{13}$ may be bonded to each other to form a group having a single ring or multi rings, and the group having a single ring or multi rings may contain a double bond. $R^{10}$ and $R^{11}$, or $R^{12}$ and $R^{13}$ may form an alkylidene group. Any one of $R^{10}$ and $R^{11}$ and any one of $R^{12}$ and $R^{13}$ may form an acid anhydride group or an imide group.

Examples of the commercial product of the cyclic olefin resin include ZEONEX and ZEONOR (norbornene-based resin) manufactured by Zeon Corporation, SUMILITIE FS-1700 manufactured by Sumitomo Bakelite Co., Ltd., ARTON (modified norbornene-based resin) manufactured by JSR Corporation, APEL (cyclic olefin copolymer) manufactured by Mitsui Chemicals, Inc., TOPAS (cyclic olefin copolymer) manufactured by Ticona, and OPTOREZ OZ-1000 Series (cyclic acrylic resin) manufactured by Hitachi Chemical Co., Ltd.

The number average molecular weight of the cyclic olefin resin may be 10000 to 200000, 15000 to 100000, or 20000 to 50000, as a polyisoprene-equivalent value measured by GPC (Gel Permeation Chromatography) using cyclohexane as solvent.

The glass transition temperature (Tg) of the cyclic olefin resin may be 100° C. or higher, 120° C. or higher, or 130° C. or higher. With a glass transition temperature of the cyclic olefin resin of lower than 100° C., deformation and the like of the substrate film may be caused by the stress resulting from drying, UV-curing, or the like of the curable resin film, the temperature during stacking of the conductive layer, or the like. In the case of stacking a conductive layer on a substrate film, annealing treatment is performed typically at about 150° C. in order to reduce the resistance value of the conductive layer, thus the cyclic olefin resin may have a glass transition temperature of 150° C. or higher. The glass transition temperature of the cyclic olefin resin may be 180° C. or lower, 170° C. or lower, or 160° C. or lower. With an excessively high glass transition temperature of the cyclic olefin resin, the formation of a film may be difficult.

The photoelastic coefficient C of the cyclic olefin resin may be $10 \times 10^{-10}$ $Pa^{-1}$ or less, $10 \times 10^{-12}$ $Pa^{-1}$ or less, or $4 \times 10^{-12}$ $Pa^{-1}$ or less. With a small photoelastic coefficient C, it is possible to inhibit the change in retardation of a substrate film caused by the tensile stress applied to the substrate film during a process of lamination or the like. The photoelastic coefficient C is a value represented by the formula: $C = \Delta n/\sigma$, wherein $\Delta n$ represents birefringence, and $\sigma$ represents stress.

The substrate film may contain, as required, various additives such as antioxidants such as phenol-based and phosphorus-based; thermal degradation inhibitors such as phenol-based; UV stabilizers such as benzophenone-based; antistatic agents such as amine-based; and lubricants such as an ester of an aliphatic alcohol and a partial ester and a partial ether of a polyalcohol. In addition, the substrate film may further contain a resin other than the cyclic olefin resin, within the scope of the present invention. The proportion of the cyclic olefin resin in the substrate film is typically 80 mass % or more, relative to the mass of the substrate film.

The method for forming a substrate film (cyclic olefin resin film) is not particularly limited. Injection molding, melt extrusion, hot pressing, solvent casting, stretching, etc. may be employed. In particular, melt extrusion is preferred, allowing the volatile components in the substrate film to be reduced. The thickness of the substrate film may be 10 μm or more, 20 μm or more, or 30 μm or more, and 250 μm or less, or 200 μm or less. In the case of the substrate film of multi-layer film, the thickness (total thickness) may be 10 μm or more, 20 μm or more, or 25 μm or more, and 250 μm or less, 150 μm or less, or 100 μm or less. With a thin substrate film, a thin and light display device can be easily obtained. A thin substrate film tends to be hardly cracked.

The thickness of a substrate film can be measured by, for example, a contact-type film thickness meter ("DIAL-GAUGE" manufactured by Mitutoyo Corporation).

The substrate film (cyclic olefin resin film) may be a film having a retardation value of 10 nm or less along the in-plane and/or thickness direction. The substrate film may be a phase difference film having an arbitrary in-plane retardation value Re and an arbitrary thickness-direction retardation value Rth. The substrate film may be a film with properties of a ¼ wavelength plate having an in-plane retardation value of 100 to 150 nm and a thickness-direction retardation value of 60 to 225 nm for transmitted visible light with a wavelength of 550 nm. The in-plane retardation value Re is a value calculated from the formula unless otherwise stated: $Re=(nx-ny)\times d$. The retardation value Rth in the film thickness direction is a value calculated from the formula unless otherwise stated: $Rth=(nx+ny)/2-nz)\times d$. Here, nx represents the refractive index in the direction to give the maximum refractive index along the direction (in-plane direction) perpendicular to the thickness direction. ny represents the refractive index along the in-plane direction perpendicular to the direction to give nx. nz represents the refractive index in the thickness direction. d represents the thickness of the film. The wavelength for the measurement is 550 nm, unless otherwise stated. The retardation value can be measured, for example, by "AxoScan" (manufactured by Axometrics, Inc.), or "KOBRA-21ADH" (manufactured by Oji Scientific Instruments).

The variation in the in-plane retardation values Re of a substrate film may be within a range of 10 nm, within a range of 5 nm, or within a range of 2 nm. The variation in the thickness-direction retardation values Rth of a substrate film may be within a range of 20 nm, within a range of 15 nm, or within a range of 10 nm With variations of the retardation values Re and Rth within these ranges, the favorable display quality of a liquid crystal display device tends to be likely to be obtained.

The phase difference film can be obtained by, for example, stretching a film containing a cyclic olefin resin. The stretching may include, for example, vertical stretching, lateral stretching, sequential biaxial stretching, simultaneous biaxial stretching, or oblique stretching. It is preferable that the substrate film to function as a ¼ wavelength plate be an obliquely stretched film. Examples of the stretching method include a roll method, a float method, and a tenter method.

Examples of the substrate film having properties of a ¼ wavelength plate include an unstretched film, a vertically stretched film, and an obliquely stretched film of ZEONOR film manufactured by Zeon Corporation. Alternatively, a resin such as SUMILITE FS-1700 manufactured by Sumitomo Bakelite Co., Ltd., ARTON manufactured by JSR Corporation, APEL manufactured by Mitsui Chemicals, Inc., TOPAS manufactured by Ticona, and OPTOREZ OZ-1000 Series manufactured by Hitachi Chemical Co., Ltd., may be processed into a film and the stretched film may be used.

When the substrate film is a multi-layer substrate film having a first surface layer, an intermediate layer, and a second surface layer as illustrated in FIG. 1, the intermediate layer may comprise a cyclic olefin resin and a UV absorber. In this case, the presence of the first surface layer and the second surface layer inhibits the UV absorber from bleeding out. For effective inhibition of the bleeding out, the first surface layer and the second surface layer include a cyclic olefin resin and may include substantially no UV absorber.

The respective cyclic olefin resins contained in the first surface layer, the intermediate layer, and the second surface layer may be the same or different. In the case of each layer having the same cyclic olefin resin, formation of the layers is easy. The first surface layer and the second surface layer can be formed of the same cyclic olefin resin as the cyclic olefin resin contained in the intermediate layer except that no UV absorber is contained. The glass transition temperature TgA of the cyclic olefin resin contained in the intermediate layer and the glass transition temperature TgB of the cyclic olefin resin contained in the first surface layer and the second surface layer may satisfy the relation: $0°\ C. \leq TgB-TgA < 15°\ C.$ Examples of the UV absorber include an organic UV absorber such as a triazine-based UV absorber, a benzophenone-based UV absorber, a benzotriazole-based UV absorber, and an acrylonitrile-based UV absorber. A benzotriazole-based UV absorber is particularly excellent in terms of the UV absorbing performance in the vicinity of a wavelength of 380 nm. The molecular weight of a UV absorber may be 400 or more and 1500 or less.

The triazine-based UV absorber may be, for example, a compound having a 1,3,5-triazine ring. Specific examples of the triazine-based UV absorber include 2-(4,6-diphenyl-1,3,5-triazin-2-yl)-5-[(hexyl)oxy]-phenol, and 2,4-bis(2-hydroxy-4-butoxyphenyl)-6-(2,4-dibutoxyphenyl)-1,3,5-triazine. Examples of the commercial product of the triazine-based UV absorber include "TINUVIN 1577" (manufactured by Ciba Specialty Chemicals Corp.).

Examples of the benzotriazole-based UV absorber include 2,2'-methylenebis [4-(1,1,3,3-tetramethylbutyl)-6-(2H-benzotriazol-2-yl) phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-(tert-butyl)phenol, 2-(2H-benzotriazol-2-yl)-4,6-di-tert-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, a reaction product of methyl-3-(3-(2H-benzotriazol-2-yl)-5-tert-butyl-4-hydroxyphenyl)propionate/polyethylene glycol 300, and 2-(2H-benzotriazol-2-yl)-6-(straight-chain and side-chain dodecyl)-4-methylphenol. Examples of the commercial product of triazole-based UV absorber include "ADEKA STAB LA-31" (manufactured by Adeka Corporation).

UV absorbers may be used singly or in combinations of two or more at any ratio.

The amount of UV absorber in an intermediate layer may be 1 part by mass or more or 3 parts by mass or more, and may be 10 parts by mass or less or 8 parts by mass or less, relative to 100 parts by mass of the intermediate layer. In the case of using two or more UV absorbers, the amount of UV absorber means the total amount of the UV absorbers. With an amount of UV absorber of the lower limit of the range or more, the transmission of UV rays with a wavelength of 200 nm to 370 nm can be effectively inhibited. With an amount of UV absorber of the upper limit of the range or less, the yellowish color of a film can be reduced, so that the deterioration of color can be suppressed. With an amount of UV absorber in the range, the deterioration of the heat resistance of a cyclic olefin resin can be suppressed, and favorable dispersion of the UV absorber can be easily ensured.

The thickness of the intermediate layer may be 10 μm or more and 40 μm or less, and the thickness of the first surface layer and the second surface layer may be 5 μm or more and 20 μm or less in total. The ratio of the thickness of the intermediate layer to the thickness of the first surface layer and the second surface layer in total {thickness of intermediate layer)/(thickness of first surface layer and second surface layer in total)} may be 1 to 3, from the viewpoint of production stability. With a variation in the thickness of the intermediate layer of ±2.0 μm or less over the entire intermediate layer, favorable image display properties of a liquid crystal display device can be easily obtained.

A multi-layer film as the substrate film can be manufactured by, for example, co-extrusion method. For example, a multi-layer film having a first surface layer, an intermediate layer, and a second surface layer can be manufactured by co-extruding a cyclic olefin resin to form the first surface layer, a cyclic olefin resin to form the intermediate layer, and a cyclic olefin resin to form the second surface layer from a die. Among co-extrusion methods, a T-die co-extrusion method is preferred. Examples of the T-die co-extrusion method include a feed block method and a multi-manifold method.

The melting temperature of the cyclic olefin resin for use in an extruder with a T-die in the T-die co-extrusion method may be Tg+80° C. or higher or Tg+100° C. or higher, and Tg+180° C. or lower or Tg+150° C. or lower. Here, "Tg" represents the glass transition temperature of a cyclic olefin resin. In the case of a substrate film having a first surface layer, an intermediate layer, and a second surface layer, the Tg is the glass transition temperature of the cyclic olefin resin contained in the first surface layer and the second surface layer. With a melting temperature of the lower limit of the range or higher at the extruder, the fluidity of the cyclic olefin resin can be sufficiently enhanced. With a melting temperature of the higher limit or lower at the extruder, the deterioration of a cyclic olefin resin can be inhibited.

In melt extrusion method such as co-extrusion method, the temperature of the cyclic olefin resin in the extruder may be Tg to (Tg+100°) C. at the resin inlet, and (Tg+50°) C. to (Tg+170°) C. at the outlet of the extruder. The dice temperature may be (Tg+50°) C. to (Tg+170°) C.

The intermediate layer containing a UV absorber may be formed from a cyclic olefin resin composition containing a cyclic olefin resin and a UV absorber. The cyclic olefin resin composition can be manufactured, for example, by a method of adding a UV absorber to a cyclic olefin resin prior to manufacturing of the substrate film by melt extrusion method, a method of using a master batch which contains a high concentration of UV absorber, or a method of adding a UV absorber to a cyclic olefin resin during manufacturing of the substrate film by melt extrusion method.

When the substrate film is a multi-layer substrate film having a first surface layer, an intermediate layer, and a second surface layer as illustrated in FIG. 1, with the intermediate layer containing a cyclic olefin resin and a UV absorber, the light transmittance of the substrate film at a wavelength of 380 nm may be 10% or less, 5% or less, or 1% or less. The light transmittance of the substrate film at a wavelength of 280 nm to 370 nm may be 1.5% or less, or 1% or less. The lower limit of light transmittance of a substrate film at a wavelength of 380 nm and at a wavelength of 280 nm to 370 nm is 0%. With a low light transmittance of a substrate film, the UV damage to a polarizer and a liquid crystal cell can be prevented in a liquid crystal display device having the substrate film. Consequently, the polarizer can be prevented from the reduction in the polarization degree and from the coloration. In addition, it is possible to stabilize driving of the liquid crystal of a liquid cell. The light transmittance can be measured with a spectrophotometer in accordance with JIS K0115.

The amount of the volatile components in a substrate film may be 0.1% or less, 0.05% or less, or 0.02% or less, relative to the mass of the substrate. With a smaller amount of volatile components, the dimensional stability improves and the time-dependent changes in optical properties such as retardation tend to decrease. Here, the volatile components mean substances having a molecular weight of 200 or less. Examples of the volatile components include remaining monomers and solvents. The total amount of the volatile components can be determined by the analysis using gas chromatography.

The substrate film (cyclic olefin resin film) may be surface-treated, for example in order to enhance the adhesion to a cured film (surface layer). Examples of the surface treatment include a plasma treatment, a corona treatment, an alkali treatment, and a coating treatment. Among them, application of a corona treatment particularly enhances the adhesion between the substrate film and the cured film. The intensity of the corona discharge electron irradiation in corona treatment is, for example, 1 to 1000 W/m²/min. The contact angle between the substrate film and water after corona treatment may be 10° to 50°. The curable composition may be applied immediately after corona treatment or may be applied after destaticizing the substrate film. From the viewpoint of improving the appearance of the surface layer, the curable composition may be applied after destaticizing the substrate film after corona treatment.

Cured Film

The cured film may exhibit a hardness ranked as "B" or higher in the pencil hardness test specified in accordance with JIS K5600-5-4 (1999).

The thickness of the cured film may be 1.0 μm or more, or 2.0 μm or more. The thickness of the cured film may also be 10.0 μm or less. With an excessively thick cured film, the visibility can decrease, and with an excessively thin cured film, the scratch resistance and the like tends to relatively decrease. In the case of having cured films on both surfaces of a substrate film, the thicknesses of the two cured films may be different, or may be the same in order to prevent curling of the laminate film or the like. The thickness of the cured film can be measured, for example, by an interference thickness meter ("F20 film thickness measurement system" manufactured by Filmetrics Japan, Inc.).

Irregularities may be formed on the surface of the cured film. The arithmetic average roughness (Ra) of the surface of the cured film may be 0.001 μm or more and 0.1 μm or less, or 0.01 μm or more and 0.1 μm or less. The 10-point average roughness (Rz) of the surface of the cured film may be 0.01 μm or more and 1.0 μm or less, or 0.1 μm or more and 1.0 μm or less. The arithmetic average roughness (Ra) and the 10-point average roughness (Rz) of a cured film can be measured by a color 3D laser microscope (VK-9700 manufactured by Keyence Corporation) or an atomic force microscope (NANOSCOPE IIIa manufactured by Digital Instruments).

The haze value of the cured film may be 1.0% or less, 0.5% or less, or 0.3% or less. With a cured film having such a haze value, the laminate film can be used, for example, in a display device having a touch panel. The haze value of a cured film can be measured by a haze meter ("HAZE-GARD II", manufactured by Toyo Seiki Seisaku-sho, Ltd.), in accordance with JIS K7136.

The static friction coefficient and the dynamic friction coefficient between a cured film and a substrate film (cyclic olefin resin film) may be 0.9 or less, or 0.6 or less.

A laminate film comprising the cured film of the present embodiment has excellent scratch resistance. The scratch resistance can be evaluated, for example, by visual observation of scratches on the surface of a coating layer, when a #0000 steel wool is pressed onto the surface of a cured film (coating layer) with a specified load and reciprocated at the same time. When the load is increased stepwise, the scratch resistance is determined based on the maximum load value causing no scratch observed on the surface. The maximum load value may be 150 gf or more, 200 gf or more, or 250 gf or more, in order to prevent scratches on the surface of the film in the manufacturing process of an image display device such as a touch panel. With the maximum load value equal to or higher than the lower limit, scratches caused by friction between the cured film and a metal shaft or the like during transportation of the film can be effectively prevented, in particular. The higher limit of the scratch resistance is typically 500 gf or less, or 2000 gf or less, though not particularly limited.

The laminate film of the present embodiment has excellent flexibility and hardly causes cracks when bent. The flexibility of a coating film can be evaluated by winding a coating film around a mandrel or a piano wire having a specified diameter with the coating layer disposed at the outside so as to visually observe the presence of cracks in a coating film (hereinafter referred to also as "cylindrical mandrel method"), or by a simple test to completely bend a laminate film in a mountain-folded shape (hereinafter referred to also as "mountain-folding method"). The mountain-folding method is a method of completely folding back (bending to an angle of 180°) a laminate film at an arbitrary spot of the laminate film with the cured film directed outside, so as to visually observe the presence of cracks in the coating film. The mountain-folding method can detect the significant difference in flexibility more easily than the cylindrical mandrel method. When the diameter of a mandrel or a piano wire is decreased stepwise, the flexibility can be determined based on the minimum diameter of the mandrel or the piano wire causing no crack observed. In the flexibility test by a cylindrical mandrel method, the diameter for the occurrence of cracks may be less than 1.5 mm, less than 1 mm, or less than 0.5 mm. With the flexibility within the ranges, the occurrence of cracks during slit cutting, punching, or the like of the film can be effectively prevented, in particular. The laminate film having such flexibility can effectively prevent the occurrence of cracks in the cured film and the occurrence of burrs on the cut edge in a manufacturing process of an image display device such as a touch panel, in particular. The lower limit of the flexibility may be, for example, 0 mm or more, or 0.01 mm or more, though not particularly limited.

Manufacturing Method of Laminate Film

The laminate film of the present embodiment can be obtained, for example, by a method comprising the steps of forming a film of curable composition on a substrate film, and curing the film of curable composition to form a cured film.

The film of curable composition can be formed, for example, by applying a curable composition on a substrate film, and removing a solvent from the curable composition applied on an as needed basis. The temperature and the pressure for removing the solvent may be appropriately determined depending on conditions such as the type of material of the curable composition, the type of solvent, and the application thickness of the curable composition. Examples of the application method include a spin coating method, a bar coating method, and a dipping method.

The film of curable composition is irradiated with UV rays so as to be cured. The UV irradiation may be performed, for example, in an inert gas such as nitrogen and argon, or in the air. The curing temperature is typically about 30° C. to 180° C., or about 60° C. to 150° C., though not specifically limited as long as the curable composition can be cured at the temperature. The curing time widely ranges depending on the curing temperature and can be set to, for example, a range of 30 seconds to 10 hours or more. The surface of the substrate film may be surface-treated by a corona treatment, a saponification treatment, heat treatment, UV irradiation, electron beam irradiation, etc., prior to the application of the curable composition.

The curable composition for use in forming a cured film may comprise (A) an acrylic resin having a polymerizable double bond; (B) a multifunctional polymerizable compound having a specific structure, and (C) an alkylene oxide modified bisphenol A di(meth)acrylate. The curable composition may further comprise other components such as (D) a urethane (meth)acrylate and (E) a photopolymerization initiator, on an as needed basis.

(A) Acrylic Resin Having Polymerizable Double Bond

The acrylic resin having a polymerizable double bond may have, for example, a main chain consisting of a copolymer containing a (meth)acrylic acid ester as a monomer unit and a side chain bonded to the main chain, containing a polymerizable double bond. The side chain containing a polymerizable double bond typically contains a (meth)acryloyl group, though not limited thereto.

The acrylic resin having a polymerizable double bond can be obtained, for example, by a method comprising the steps of copolymerizing one or two or more types of (meth)acrylic acid esters (a1) and one or two or more types of polymerizable compounds (a2) having a reactive functional group so as to obtain an acrylic resin having a reactive functional group, and reacting one or two or more types of compounds (b) having a functional group reactive with the reactive functional group of the acrylic resin and a polymerizable double bond with an acrylic resin, so as to introduce the polymerizable double bond into the side chain of the acrylic resin.

The (meth)acrylic acid ester (a1) may be, for example, at least one selected from the group consisting of a straight-chain or branched alkyl (meth)acrylate, an alicyclic (meth)acrylate, an aromatic (meth)acrylate, an alkoxyalkyl (meth)acrylate, an alkoxy(poly)alkylene glycol (meth)acrylate, alkoxyalkoxyalkyl (meth)acrylate, an octafluoropentyl (meth)acrylate, and a dialkylaminoalkyl (meth)acrylate.

Examples of the straight-chain or branched alkyl (meth)acrylate include methyl (meth)acrylate, ethyl (meth)acrylate, n-propyl (meth)acrylate, n-butyl (meth)acrylate, isobutyl (meth)acrylate, t-butyl (meth)acrylate, ethylhexyl (meth)acrylate, stearyl (meth)acrylate, lauryl (meth)acrylate, and tridecyl (meth)acrylate.

Examples of the alicyclic (meth)acrylate include cyclohexyl (meth)acrylate, isobornyl (meth)acrylate, and dicyclopentanyl (meth)acrylate.

Examples of the aromatic (meth)acrylate include phenoxyethyl (meth)acrylate.

Examples of the alkoxyalkyl (meth)acrylate include ethoxyethyl (meth)acrylate and butoxyethyl (meth)acrylate.

Examples of the alkoxy (poly)alkylene glycol (meth)acrylate include methoxy diethylene glycol (meth)acrylate, ethoxy diethylene glycol (meth)acrylate, methoxy triethylene glycol (meth)acrylate, butoxy triethylene glycol (meth)acrylate, and methoxy dipropylene glycol (meth)acrylate.

Examples of the alkoxyalkoxyalkyl (meth)acrylate include 2-methoxyethoxyethyl (meth)acrylate and 2-ethoxyethoxyethyl (meth)acrylate.

Examples of the octafluoropentyl (meth)acrylate include 1H,1H,5H-octafluoropentyl (meth)acrylate.

Examples of the dialkylaminoalkyl (meth)acrylate include N,N-dimethylaminoethyl (meth)acrylate and N,N-diethylaminoethyl (meth)acrylate.

The polymerizable compound (a2) may have one or more reactive functional groups selected from the group consisting of an epoxy group and a hydroxyl group. The epoxy group and the hydroxyl group have good reactivity with a compound (b) having a carboxyl group, isocyanate group, etc.

Examples of the polymerizable compound (a2) having an epoxy group as the reactive functional group include a (meth)acrylate having an epoxy group such as glycidyl (meth)acrylate and 3,4-epoxycyclohexyl (meth)acrylate.

Examples of the polymerizable compound (a2) having a hydroxyl group as the reactive functional group include a hydroxyalkyl (meth)acrylate such as 2-hydroxyethyl (meth)acrylate, 2-hydroxybutyl (meth)acrylate, and 2-hydroxypropyl (meth)acrylate.

The acrylic resin may contain other polymerizable compounds as monomer units in addition to the (meth)acrylic acid ester (a1) and the polymerizable compound (a2). Examples of the other polymerizable compounds include an aromatic vinyl compound such as styrene and vinyltoluene.

The compound (b) having a polymerizable double bond has at least one functional group reactive with the reactive functional group (epoxy group, hydroxyl group, etc.) of the polymerizable compound (a2) selected from the group consisting of a carboxyl group, an isocyanate group, etc.

Specific examples of the compound (b) having a carboxyl group include (meth)acrylic acid, a dimer of (meth)acrylic acid (e.g. ARONIX M5600 manufactured by Toagosei Co., Ltd.), caprolactone-modified (meth)acrylic acid (e.g. ω-carboxy-polycaprolactone monoacrylate, ARONIX M5300 manufactured by Toagosei Co., Ltd.), a compound obtained by the ring-opening reaction of a (meth)acrylate having a hydroxyl group and carboxylic anhydride (e.g. phthalic acid monohydroxy ethyl acrylate, ARONIX M5400 manufactured by Toagosei Co., Ltd.), and β-acryloyl oxyethyl hydrogen succinate (e.g. NK ESTER A-SA manufactured by Shin-Nakamura Chemical Co., Ltd.).

Specific examples of the compound (b) having an isocyanate group include methacryloyloxyethyl isocyanate (e.g. KARENZ MOI manufactured by Showa Denko K.K.).

The double bond equivalent of the acrylic resin having a polymerizable double bond may be 220 or more and 2500 or less. With a double bond equivalent of the acrylic resin of less than 220, the flexibility of a coating film tends to decrease. With a double bond equivalent of the acrylic resin of more than 2500, the scratch resistance tends to decrease. For the same reason, the double bond equivalent of the acrylic resin may be 230 or more and 1000 or less, or 240 or more and 500 or less.

In the present specification, the double bond equivalent is defined by the formula: Double bond equivalent=molecular weight/number of double bonds in the same molecule.

The double bond equivalent value defined by the above formula can be estimated, for example, from the quantity of the double bonds in a sample determined by the iodine value measured by the method in accordance with JIS K0070 (enacted in 1992), and the mass or molecular weight of the sample. In the case of a sample which may contain a plurality of components, the double bond equivalent may be obtained by isolating each of the components on an as needed basis and measuring the iodine value of the isolated components.

The weight average molecular weight of the acrylic resin having a polymerizable double bond may be 5000 or more and 200000 or less. With a weight average molecular weight of 5000 or more, the acrylic resin has higher scratch resistance, and with a weight average molecular weight of 200000 or less, the acrylic resin has higher flexibility. From the viewpoint of obtaining excellent appearance of a coating film when the curable composition is applied to a transparent plastic film, the acrylic resin may have a weight average molecular weight of 10000 or more and 100000 or less, or 10000 or more and 60000 or less. Here, the weight average molecular weight means a standard polystyrene-equivalent value measured by gel permeation chromatography.

(B) Multifunctional Compound

The multifunctional compound for use as the component (B) has at least three polymerizable double bonds. The group containing the polymerizable double bonds is typically a (meth)acryloyl group, though not limited thereto. The multifunctional polymerizable compound may have one, two, or three or more monovalent groups represented by the following formula (2-1) or (2-2) as the group containing a polymerizable double bond. As the result of the introduction of the group represented by the formula (2-1) or (2-2) as the group containing a polymerizable double bond, the cured film to be formed can maintain the high strength, while relaxing the stress when deformed. Consequently, excellent flexibility of the cured film can be obtained. Since the multifunctional polymerizable compound has three or more polymerizable double bonds, the scratch resistance of the cured film is improved. The number of the polymerizable double bonds in a multifunctional polymerizable compound may be 6 or more and 9 or less. All the polymerizable double bonds in a multifunctional polymerizable compound may be contained in the group represented by the formula (2-1) or (2-2), or a multifunctional polymerizable compound may contain a group having a polymerizable double bond other than the group represented by the formula (2-1) or (2-2).

(2-1)

(2-2)

In the formula (2-1), $R^1$ represents a hydrogen atom or a methyl group, d represents an integer of 2 to 4, and e represents an integer of 1 to 6. In the formula (2-2), $R^1$ represents a hydrogen atom or a methyl group, m is 5, and n represents an integer of 1 to 4.

The double bond equivalent of the multifunctional polymerizable compound may be 130 or more and 500 or less, 130 or more and 300 or less, or 130 or more and 250 or less. From the viewpoint of the scratch resistance of a protective film, a better effect can be thereby obtained.

Use of a (meth)acrylic acid ester of alkylene oxide modified or caprolactone modified polyalcohol as the multifunctional polymerizable compound allows a protective film excellent in flexibility to be easily formed while maintaining high hardness.

In the present specification, "alkylene oxide modified" means a compound having an oxyethylene group or a polyoxyethylene group which is formed by adding an alkylene oxide such as ethylene oxide to the hydroxyl group of an alcohol compound. Ethylene oxide modified may also be abbreviated as "EO modified", and propylene oxide modified may also be abbreviated as "PO modified", in some cases. The multifunctional polymerizable compound derived from an alkylene oxide modified polyalcohol has a monovalent group represented by the formula (2-1).

In the present specification, "caprolactone modified" means a compound having a divalent group which is formed by reacting the hydroxyl group of an alcohol compound with caprolactone (e.g. ε-caprolactone). The multifunctional polymerizable compound derived from a caprolactone modified polyalcohol has a monovalent group represented by the formula (2-2).

The (meth)acrylic acid ester of alkylene oxide modified or caprolactone modified polyalcohol is represented, for example, by the following formula (20).

In the formula (20), $R^{10}$ represents a moiety of a polyalcohol having three or more hydroxyl groups (a portion excluding the hydroxyl groups), Z represents a monovalent group represented by the formula (2-1) or (2-2), or a monovalent group having a polymerizable double bond other than the groups described above, x represents an integer of 3 or more, y represents an integer of 0 or more, and x+y is equal to the valence of $R^{10}$. A plurality of Z in a molecule may be the same or different, and one or more of a plurality of Z are monovalent groups represented by the formula (2-1) or (2-2). Here, x+y (the total number of hydroxyl groups of polyalcohol) may be 3 to 12, and x may be 3 to 9.

Examples of the polyalcohol corresponding to $R^{10}$ may include at least one selected from the group consisting of polyglycerol, dipentaerythritol, pentaerythritol, and trimethylolpropane.

Specific examples of the multifunctional polymerizable compound include alkylene oxide modified or caprolactone modified dipentaerythritol hexa(meth)acrylate, alkylene oxide modified or caprolactone modified dipentaerythritol penta(meth)acrylate, alkylene oxide modified or caprolactone modified dipentaerythritol tetra(meth)acrylate, alkylene oxide modified or caprolactone modified dipentaerythritol tri(meth)acrylate, alkylene oxide modified or caprolactone modified pentaerythritol tetra(meth)acrylate, alkylene oxide modified or caprolactone modified trimethylolpropane tri(meth)acrylate, and alkylene oxide modified or caprolactone modified polyglycerol polyacrylate. These compounds may be used singly or in combinations of two or more. For example, alkylene oxide modified or caprolactone modified dipentaerythritol hexa(meth)acrylate and alkylene oxide modified or caprolactone modified polyglycerol polyacrylate may be used in combination.

(C) Alkylene Oxide Modified Bisphenol A di(meth)acrylate

The alkylene oxide modified bisphenol A di(meth)acrylate has a structure containing an oxyalkylene group represented by the following formula (3).

In the formula (3), $R^1$ represents a hydrogen atom or a methyl group, f represents an integer of 2 to 5, g and h represent an integer of 1 or more, and g+h is 2 to 40. Here, f may be 2 or 3. In other words, the alkylene oxide modified bisphenol A di(meth)acrylate may be ethylene oxide modified (EO modified) or propylene oxide modified (PO modified) bisphenol A di(meth)acrylate. Here, g+h may be 10 or more and 40 or less, or 25 or more and 35 or less. With g+h in these ranges, a cured film having enhanced stress relaxation properties, excellent in flexibility, in particular, can be obtained. The curable composition may contain one or two or more compounds represented by the formula (3).

Content of Components (A) to (C)

The curable composition may contain (A) the acrylic resin having a polymerizable double bond in a ratio of 8 parts by mass or more and 40 parts by mass or less, 10 parts by mass or more and 25 parts by mass or less, or 12 parts by mass or more and 20 parts by mass or less. With an amount of the acrylic resin in the range, further improved levels of both the scratch resistance and the flexibility can be achieved. With an amount of the acrylic resin of less than 8 parts by mass, the flexibility tends to relatively decrease. With an amount of the acrylic resin of more than 40 parts by mass, the scratch resistance tends to relatively decrease.

The curable composition may contain (B) the multifunctional polymerizable compound in a ratio of 40 parts by mass or more and 80 parts by mass or less, 45 parts by mass or more and 73 parts by mass or less, or 58 parts by mass or more and 69 parts by mass or less. With an amount of the multifunctional polymerizable compound in the range, further improved levels of both the scratch resistance and the flexibility can be achieved. With an amount of the multifunctional polymerizable compound of less than 40 parts by mass, the scratch resistance tends to relatively decrease. With an amount of the multifunctional polymerizable compound of more than 80 parts by mass, the flexibility tends to relatively decrease.

The curable composition may contain (C) the alkylene oxide modified bisphenol A di(meth)acrylate in a ratio of 4 parts by mass or more and 40 parts by mass or less, 5 parts by mass or more and 30 parts by mass or less, or 10 parts by mass or more and 20 parts by mass or less. With an amount of the alkylene oxide modified bisphenol A di(meth)acrylate in the range, further improved levels of both the scratch resistance and the flexibility can be achieved. With an amount of the alkylene oxide modified bisphenol A di(meth) acrylate of less than 4 parts by mass, the flexibility tends to relatively decrease. With an amount of the alkylene oxide modified bisphenol A di(meth)acrylate of more than 40 parts by mass, the scratch resistance tends to relatively decrease.

These ratios can be adjusted relative to the total mass of the curable composition, or, in the case of the curable composition containing a solvent, to the total mass of the components excluding the solvent from the curable composition, in amount of 100 parts by mass. The ratios of the other components are adjusted in the same manner.

(D) Urethane (meth)acrylate

The curable resin may contain a urethane (meth)acrylate having one or two or more urethane groups and two or more (meth)acryloyl groups. The urethane (meth)acrylate can further improve the scratch resistance of the cured film.

With a reduced double bond equivalent of the urethane (meth)acrylate, the scratch resistance tends to be further improved. More specifically, the double bond equivalent of the urethane (meth)acrylate may be less than 130 and 80 or more.

The urethane (meth)acrylate can be obtained, for example, by reacting a polyisocyanate compound having two or more isocyanate groups with a hydroxyl group-containing (meth)acrylate having a hydroxyl group and a (meth)acryloyl group.

Specific examples of the polyisocyanate compound for use in forming a urethane (meth)acrylate include tolylene diisocyanate, xylylene diisocyanate, diphenylmethane diisocyanate, hexamethylene diisocyanate, trimethylhexamethylene diisocyanate, tetramethylxylidene diisocyanate, isophorone diisocyanate (IPDI), hydrogenated tolylene diisocyanate, hydrogenated xylylene diisocyanate, hydrogenated diphenylmethane diisocyanate, m-phenylene diisocyanate, biphenylene diisocyanate, tetramethylene diisocyanate, hexamethylene diisocyanate, and the dimers or trimers thereof. Examples of the dimer include an addition condensate of dihexamethylene diisocyanate (dimer of hexamethylene diisocyanate), an addition condensate of trimethylhexamethylene diisocyanate (dimer or trimer of trimethylhexamethylene diisocyanate). IPDI and/or an addition condensate of dihexamethylene diisocyanate may be selected as the polyisocyanate compound.

Specific examples of the hydroxyl group-containing (meth)acrylate for use in forming a urethane (meth)acrylate include a hydroxyalkyl (meth)acrylate such as 2-hydroxyethyl(meth)acrylate, 2-hydroxypropyl (meth)acrylate, 4-hydroxybutyl (meth)acrylate, pentaerythritol tri(meth)acrylate, trimethylolpropane di(meth)acrylate, and dipentaerythritol penta(meth)acrylate; isocyanuric acid di(meth)acrylic acid ester, and ethylene oxide modified and caprolactone modified products thereof. In order to obtain excellent properties of a cured film, in particular, a urethane (meth)acrylate obtained by reacting a polyisocyanate compound with at least one hydroxyl group-containing (meth)acrylate selected from the group consisting of pentaerythritol tri(meth)acrylate, dipentaerythritol penta(meth)acrylate, and trimethylolpropane di(meth)acrylate can be used. Isophorone diisocyanate may be selected as the polyisocyanate compound.

The curable composition may contain urethane (meth)acrylate in a ratio of 0.5 parts by mass or more and 15 parts by mass or less, 1 part by mass or more and 10 parts by mass or less, or 1 part by mass or more and 5 parts by mass or less. With an amount of the urethane (meth)acrylate in the range, the scratch resistance can be further improved while the excellent flexibility is maintained. With an amount of the urethane (meth)acrylate of more than 15 parts by mass, the flexibility tends to relatively decrease.

(E) Photopolymerization Initiator

The curable composition may contain a photopolymerization initiator for the purposes of curing the coating film and the like.

Any compound decomposable under irradiation of light to generate a radical which initiates polymerization can be used as the photopolymerization initiator without specific limitations. Specific examples of the photopolymerization initiator include acetophenone, acetophenone benzylketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyldimethyl ketal, 1-(4-isopropylphenyl-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyl diphenylphosphine oxide, bis-(2,6-dimethoxybenzoyl)-2,4, 4-trimethylpentylphosphine oxide, and oligo(2-hydroxy-2-methyl-1-(4-(1-methylvinyl)phenyl)propanone). These compounds may be used singly or in combinations of two or more.

The curable composition may contain a photopolymerization initiator in a ratio of 0.01 parts by mass or more and 10 parts by mass or less, 0.1 parts by mass or more and 6 parts by mass or less, or 1 part by mass or more and 5 parts by mass or less. With an amount of the photo-polymerizable compound in the range, particularly favorable photo-polymerizability can be obtained.

(F) Fine Particles

The curable composition may contain fine particles for the purpose of controlling the optical properties such as refractive index or enhancing the anti-blocking properties.

The fine particles may have an average particle diameter of 1 to 1000 nm, or 5 to 200 nm. With an average particle diameter of the fine particles in the range, light scattering is prevented and excellent transparency and anti-blocking properties can be obtained. The average particle diameter can be measured by a laser diffraction and scattering method.

The refractive index of fine particles may be 1.40 or more and 1.70 or less, 1.40 or more and 1.60 or less, or 1.40 or more and 1.50 or less, though not particularly limited. The difference in the refractive index between the fine particles and the portion other than the fine particles in a cured film (matrix resin) may be 0.05 or less, 0.02 or less, or 0.01 or less. The interference unevenness and the increase in the haze of a cured film resulting from the difference in refractive index can be thereby suppressed.

Specific examples of the fine particles include inorganic fine particles such as silicon dioxide particles, tin oxide particles, calcium carbonate particles, zirconium oxide particles, talc, kaolin, barium sulfate particles, titanium dioxide particles, aluminum oxide particles, zinc oxide particles, antimony pentoxide particles, indium oxide/tin oxide particles, antimony oxide/tin oxide particles, indium oxide particles, antimony oxide particles, magnesium fluoride particles, zeolite particles, synthesized mica particles, smectite particles, and calcium sulfate particles, though not particularly limited. Specific examples of the fine particles further include organic polymer particles and organic-inorganic hybrid particles such as (meth)acrylic particles, styrene-acrylic copolymer particles, polystyrene particles, polyester particles, urethane particles, and silicone particles. Fine particles may be surface-treated. The fine particles may be inorganic particles, and, in particular, may be silicon dioxide, since the surface hardness of a cured film can be enhanced, and, in particular, the strength can be enhanced with a desired refractive index. One or two or more types of fine particles may be used.

The amount of fine particles in a curable composition (in the case of two or more types of fine particles being contained, total amount thereof) may be 0.1 parts by mass or more and 60 parts by mass or less, or 1 part by mass or more and 50 parts by mass or less, relative to 100 parts by mass of the curable composition. With an amount of the fine particles in these ranges, the favorable transparency and anti-blocking properties can be obtained.

Solvent

The curable composition may further contain a solvent which dissolves or disperses each of the components for the purposes of controlling the viscosity, the coatability, the thickness of the coating film, etc.

Specific examples of the solvent include: ketones such as acetone, methyl ethyl ketone, methyl isobutyl ketone, cyclopentanone, and cyclohexane; esters such as ethyl acetate and butyl acetate; alcohols such as isopropyl alcohol and ethyl alcohol; aromatic hydrocarbons such as benzene, toluene, xylene, methoxybenzene, and 1,2-dimethoxybenzene; phenols such as phenol and parachlorophenol; halogenated hydrocarbons such as chloroform, dichloromethane, dichloroethane, tetrachloroethane, trichloroethylene, tetrachloroethylene, and chlorobenzene. These solvents may be used singly or in combinations of two or more.

Other Additive

The curable composition may contain other components within the scope of the present invention.

The curable composition may contain an antifouling agent, a flame retardant, an anti-oxidant, a dispersant, a UV absorber, a pigment, a plasticizer, a surfactant, a thixotropic agent, etc. These additives may be used singly or in combinations of two or more.

Liquid Crystal Display Device

Figure 2:
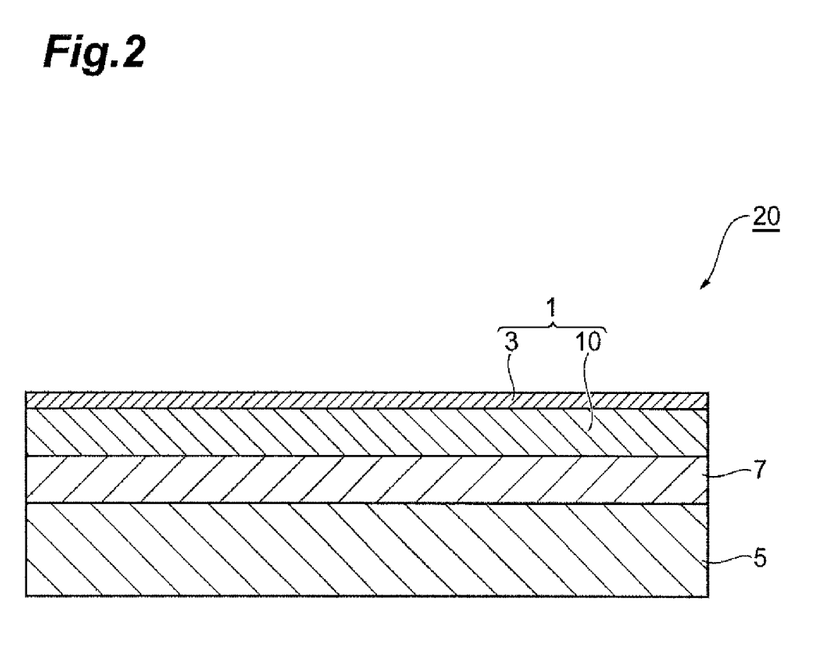
FIG. 2 is a cross-sectional view illustrating an embodiment of a liquid crystal display device.

FIG. 2 is a cross-sectional view illustrating an embodiment of a liquid crystal display device. The liquid crystal display device 20 illustrated in FIG. 2 comprises a liquid crystal cell 5, a polarizer 7 disposed on the viewing side of the liquid crystal cell 5, and a laminate film 1 disposed on the viewing side of the polarizer 7. The laminate film of the embodiment described above can be used as the laminate film 1. Any protective film for a polarizing plate may be disposed between the polarizer 7 and the laminate film 1.

The polarizer may be a film obtained, for example, by stretching a polyvinyl alcohol-based film doped with iodine, though not particularly limited. The protective film for a polarizing plate for use may be an isotropic film having optical isotropy, or may be a phase difference film having a desired retardation.

Since the substrate film 10 of the laminate film 1 contains a cyclic olefin resin, the liquid crystal display device of the present embodiment can have more favorable heat resistance and moisture resistance than conventional liquid crystal display devices having the protective film made of material such as triacetyl cellulose for a polarizing plate. The laminate film 1 can be laminated without using an aqueous adhesive during lamination. Without using an aqueous adhesive, the quality degradation in a durability test under high temperature and high moisture can be suppressed. In the case of the substrate film 10 containing a UV absorber, the constituent components such as a liquid crystal cell and a polarizer can be protected from the exposure to the UV during manufacturing of the liquid crystal display device and the exposure to the UV in light from outside during use of the liquid crystal display device.

The liquid crystal cell may be a cell in any mode of TN mode, VA mode, IPS mode or the like. The IPS-mode liquid crystal cell allows the display color of the liquid crystal to hardly change when the view angle is changed. In the case of using a liquid crystal display device as a touch panel sensor, an in-cell type liquid crystal cell may be used to reduce the thickness of the whole liquid crystal display device.

The laminate film is provided such that a cured film and a substrate film are typically disposed in this order from the crystal liquid cell side. A glass sheet may be further disposed on the opposite side of the substrate film of the cured film via an adhesive or the like. In the case of a laminate film having a ¼ wavelength plate as the substrate film, it is preferable that the laminate film be disposed such that the slow phase axis of the substrate film in the laminate film is set at a specified angle θ to the transmission axis of the polarizer. The angle θ may be specifically 40° or more or 43° or more, and 50° or less or 48° or less. The angle θ may be in the range of 45°±1°. With the laminate film being disposed such that the slow phase axis of the substrate film is set at an angle A to the transmission axis of the polarizer, the polarized light transmitted through the liquid crystal cell and the polarizer, passing through the laminate film, can be transformed to the circularly polarized light or the elliptically polarized light. Consequently, the display content of the liquid crystal display device can be visually observed even through polarized sunglasses.

EXAMPLES

The present invention is described in detail with reference to Examples as follows. The present invention is not limited to the Examples, though.

1. Test Method and Measurement Method (1) Double Bond Equivalent

The number of moles of acrylic acid for use in synthesis was regarded as the number of the polymerizable double bond in a polymer acrylic acrylate (acrylic resin), and the double bond equivalent of a polymer acrylic acrylate was calculated from the formula: Double bond equivalent=(total mass parts of monomers for use in synthesis)/(number of moles of acrylic acid for use in synthesis). The double bond equivalent calculated from the formula can be regarded as the average of double bond equivalent of the synthesized polymer acrylic acrylate.

The double bond equivalent of each of the components (B) to (D) was calculated from the following formula.

Double bond equivalent=weight average molecular weight (value reported by manufacturer)/number of polymerizable double bonds in the same molecule (2) Scratch Resistance Test Using a surface property tester manufactured by Shinto Scientific Co., Ltd., a steel wool #0000 with a load pressed onto the cured film of a laminate film was reciprocated 10 times at a rate of 2000 mm/min, so as to scrub the surface of the cured film. The load was increased stepwise, and the maximum load causing no scratch observed on the surface of the cured film was obtained. With a maximum load of 150 gf or more, the scratch resistance was regarded to be sufficient.

(3) Flexibility Test

With the cured film being disposed at the upper side, a laminate film was mountain-folded at 7 different spots arbitrarily selected, and the number of spots where the laminate film cracked was counted. In the case of the number of spots where the laminate film cracked being zero, the flexibility was regarded to be sufficient. The point for overall evaluation was set as follows.

5 points: The number of spots where the laminate film cracked is 0.

3 points: The number of spots where the laminate film cracked is 1 to 3.

1 point: The number of spots where the laminate film cracked is 4 or more.

(4) Adhesion Test

The adhesion between a substrate film and a cured film was evaluated by a cross-cut cellophane tape peel test in accordance with JIS K5400, based on the remaining percentage (%) of a grid of 100 squares measuring 1 mm per side in total. With a remaining percentage of 90% or more, the adhesion was regarded to be sufficient. The point for overall evaluation was set as follows.

3 points: The remaining percentage is 90% or more and 100% or less.

2 points: The remaining percentage is 50% or more and less than 90%.

1 point: The remaining percentage is 0% or more and less than 50%.

(5) Slidability Test

A slidability test was performed using a sliding test apparatus manufactured by HEIDON. Two laminate films were fixed to the sample fixing part of the sliding portion in the sliding test apparatus, such that the cured films were superimposed to each other. With the fixed laminate films applied with a vertical load of 50 gf or 200 gf, it was observed whether the one laminate film slid or not when the sliding portion was moved in the horizontal direction. In the case of a laminate film sliding under a load of 200 gf, it was regarded that the laminate film had slidability for a load of 200 gf or more. In the case of a laminate film not sliding under a load of 50 gf, it was regarded that the laminate film had slidability for a load of less than 50 gf. The laminate film having slidability for a load of 200 gf or more was regarded to have sufficient slidability. The point for overall evaluation was set as follows.

2 points: The laminate film slides under a load of 200 gf.

1 point: The laminate film does not slide under a load of 50 gf.

(6) Overall Evaluation of Laminate Film

Based on the total point of the evaluation results in (2) to (5), the criteria for the overall evaluation of a laminate film were as follows.

Good: The total point is 11 to 12.

Fair: The total point is 9 to 10.

Poor: The total point is 8 or less.

(7) Arithmetic Average Roughness (Ra) of Surface of Cured Film

An atomic force microscope (NANOSCOPE Ma manufactured by Digital Instruments) was used to measure the arithmetic average roughness (Ra) of the surface of a cured film.

(8) Pencil Hardness of Cured Film

The pencil hardness of a cured film was measured in accordance with JIS K5600-5-4: Scratch hardness (pencil method).

2. Raw Material

Synthesis of (A) Acrylic Resin (Polymer Acrylate) Having Polymerizable Double Bond In methyl isobutyl ketone (MIBK), 80 parts by mass of glycidyl methacrylate (GMA), 18 parts by mass of methyl methacrylate (MMA), and 2 parts by mass of ethyl acrylate (EA) were solution-polymerized by a conventional method to synthesize an acrylic resin having an epoxy group derived from glycidyl methacrylate. Through the reaction of the epoxy group of the acrylic resin obtained with an acrylic acid, an acrylic resin having an acryloyloxy group (polymer acrylate) was obtained. To one equivalent of GMA for use in the polymerization reaction, one equivalent of acrylic acid was used for the reaction. The polymer acrylate obtained had a weight average molecular weight of 15000 and a double bond equivalent of 256.

The weight average molecular weight of a polymer acrylate is a value measured by gel permeation chromatography (GPC) method and obtained by conversion with a standard polystyrene calibration curve. The measurement conditions for the GPC method are as follows. The weight average molecular weight of the polymer acrylates in the following synthesis examples were measured under the same conditions.

Apparatus: HLC-8320GPC (with built-in RI detector) manufactured by Tosoh Corporation Detector: RI (differential refractometer)

Solvent: genuine first-grade THF (tetrahydrofuran)

Guard column: TSK-guard column Super MP(HZ)-H (one piece)

Guard column size: 4.6 mm (ID)×20 mm

Column: TSK-GEL SuperMulitipore HZ-H manufactured by Tosoh Corporation (three pieces connected)

Column size: 4.6 mm (ID)×150 mm Temperature: 40° C.

Sample concentration: 0.01 g/5 mL

Injection amount: 10 µL

Flow rate: 0.35 mL/min

3. Preparation of Curable Composition

The polymer acrylate was used as the component (A). The following materials were prepared as the components (B), (C), and (D).

(B) Multifunctional Polymerizable Compound

B1: Caprolactone modified dipentaerythritol hexaacrylate (double bond equivalent: 135, KAYRAD DPCA-20 manufactured by Nippon Kayaku Co., Ltd., 2 moles of caprolactone added (in formula (2-2), n on average in total in a molecule: 2), hexafunctional)

B2: Ethylene oxide modified polyglycerol polyacrylate (double bond equivalent: 244, NK ECONOMER A-PG5027E manufactured by Shin-Nakamura Chemical Co., Ltd., 27 moles of ethylene oxide added (in formula (2-1), e on average in total in a molecule: 27), nonafunctional)

(C) Alkylene Oxide Modified Bisphenol a Diacrylate

EO modified bisphenol A diacrylate (FANCRYL FA-323A manufactured by Hitachi Chemical Co., Ltd.: a compound represented by formula (3), wherein $R^1$ represents a hydrogen atom, f is 2, and g+h is 30)

(D) Urethane Acrylate

Decafunctional urethane acrylate (double bond equivalent: 116, HITALOID HA7909-1 manufactured by Hitachi Chemical Co., Ltd.)

The solid contents (components excluding solvent) composed of 20 parts by mass of component (A), 20 parts by mass of B1 of the component (B), 52 parts by mass of B2 of the component (B), 15 parts by mass of component (C), 3 parts by mass of component (D), and 150 parts of methyl isobutyl ketone (MIBK) as solvent were mixed and stirred at 40° C. for 1 hour to obtain a solution of the curable components.

In MIBK, 100 parts by mass of the solution of the curable components, 40 parts by mass of a sol of silica particles (fine particles 1) (in terms of the amount of silica particles), 0.5 parts by mass of a leveling agent (UV-3500 manufactured by BYK), and 4 parts by mass of photopolymerization initiator (IRGACURE 184 manufactured by BASF) were stirred and mixed by an agitator, so that a curable composition for coating was prepared. A methyl ethyl ketone silica sol (MEK-ST-L manufactured by Nissan Chemical Industries, Ltd., number average particle diameter: 0.056 µm, silica particle concentration: 30% by mass, in a spherical shape) was used as the sol of silica particles. The curable composition was used to prepare a laminate film.

4. Preparation of Laminate Film and Evaluation

Example 1

A cyclic olefin resin film having a thickness of 100 µm (trade name: ZEONOR FILM ZF16, manufactured by Zeon Corporation, glass transition temperature: 163° C.) was prepared as the substrate film. On one surface of the substrate film, the above curable composition was applied to a thickness of 2.5 µm with a bar coater. The coating film was dried by heating in a drying machine for 1 minute. The dried coating film was irradiated with UV at a light intensity of 400 mJ/cm$^2$, using a conveyor-type high pressure mercury lamp. With the UV irradiation, the cured film of the curable composition was formed, so that a laminate film was obtained. During the UV irradiation, nitrogen was introduced, so that the oxygen concentration was maintained at 10 ppm or less.

Example 2

A cyclic olefin resin film having a thickness of 100 µm (trade name: ZEONOR FILM ZF14, manufactured by Zeon Corporation, glass transition temperature: 136° C.) was prepared as the substrate film. A laminate film having a cured film was prepared in the same procedure as in Example 1 except that the above substrate film was used.

Example 3

The pellets of a cyclic olefin resin A1 ("ZEONOR 1600", manufactured by Zeon Corporation, glass transition temperature: 163° C.) was dried at 100° C. for 4 hours, using a hot air drying machine with the air circulating. The dried pellets were supplied to an extruder and melted in the extruder. The melted resin was extruded into a sheet form from a T-die onto a casting drum through a polymer pipe and a polymer filter, and cooled to obtain a substrate film having a thickness of 35 µm. A laminate film having a cured film was prepared in the same procedure as in Example 1 except that the above substrate film was used.

Example 4

A cyclic olefin resin A2 of a copolymer of norbornene and ethylene with a copolymerization ratio of norbornene to ethylene of 82:18 (glass transition temperature: 170° C., melt volume rate (MVR): 1.5, trade name: "TOPAS", manufactured by TOPAS Advanced Polymers, Inc.) was prepared. The resin was formed by a melt-extrusion method with a resin temperature of 300° C. and a draw roll temperature of 130° C., so that a cyclic olefin resin film having a thickness of 100 µm was obtained. A laminate film having a cured film was prepared in the same procedure as in Example 1 except that the cyclic olefin resin film was used as the substrate film.

Example 5

A cyclic olefin resin film having a thickness of 100 µm (trade name: ZEONOR FILM ZF16, manufactured by Zeon Corporation, glass transition temperature: 163° C.) was prepared as the substrate film. A laminate film having a cured film was prepared in the same procedure as in Example 1 except that the above substrate film was used and that the thickness of the curable composition after application was controlled to 1.5 µm.

Example 6

To 100 parts by mass of the curable composition prepared as described in "3. Preparation of curable composition", 30 parts by mass of zirconium sol particles (fine particles 2) (OZ-S30K manufactured by Nissan Chemical Industries, Ltd., average particle diameter: 10 nm) were further added. A laminate film having a cured film was prepared in the same procedure as in Example 1 except that the curable composition after the addition was used.

Example 7

A laminate film having a cured film was prepared in the same procedure as in Example 6 except that the amount of the zirconium sol particles (fine particles 2) was changed to 25 parts by mass.

Example 8

The pellets of a cyclic olefin resin A3 ("ZEONOR", manufactured by Zeon Corporation, glass transition temperature: 126° C.) was dried at 100° C. for 4 hours, using a hot air drying machine with the air circulating. The dried pellets were supplied to an extruder and melted in the extruder. The melted resin was extruded into a sheet form from a T-die onto a casting drum through a polymer pipe and a polymer filter, and cooled to obtain an unstretched film (A) having a thickness of 70 µm. The unstretched film (A) obtained was supplied to a tenter stretching machine and obliquely stretched by the tenter stretching machine to obtain a ¼ wavelength plate. The stretching conditions for the oblique stretching included a stretching ratio of 2.36 and a stretching temperature of 144° C. The ¼ wavelength plate obtained had an in-plane retardation value Re of 130 nm, a thickness of 47 nm, and an angle of the slow phase axis direction to the width direction of 45°.

A laminate film having a cured film was prepared in the same procedure as in Example 1 except that the ¼ wavelength plate was used as the substrate film.

Example 9

One hundred parts by mass of a cyclic olefin resin film A3 ("ZEONOR", manufactured by Zeon Corporation, glass transition temperature: 126° C.) and 5.5 parts by mass of a benzotriazole-based UV absorber ("LA-31" manufactured by ADEKA Corporation) were mixed by a biaxial extruder. Subsequently, the mixture was supplied to a hopper connected to the extruder, supplied to a monoaxial extruder, and melt-extruded to obtain a cyclic olefin resin composition J1 which contained the UV absorber. The amount of the UV absorber contained in the cyclic olefin resin composition J1 was 5.2 parts by mass and the glass transition temperature was 118° C.

A monoaxial extruder having a double flight screw with a diameter of 50 mm (ratio of effective screw length L to screw diameter D: L/D=32) having a polymer filter in a leaf disc shape with an opening of 3 μm was prepared. The cyclic olefin resin composition J1 was supplied to the hopper mounted on the monoaxial extruder. The cyclic olefin resin composition J1 was melted and the melted cyclic olefin resin composition J1 was supplied to a multi-manifold die, with the extruder having an outlet temperature of 280° C. and a gear pump revolution of 10 rpm. The die slip of the multi-manifold die has an arithmetic surface roughness Ra of 0.1 μm.

In addition to the monoaxial extruder to which the cyclic olefin resin composition J1 was supplied, a monoaxial extruder with a diameter of 50 mm (L/D=32) having a polymer filter in a leaf disc shape with an opening of 3 μm was prepared. The cyclic olefin resin A3 used in manufacturing of the cyclic olefin resin composition J1 was supplied to the hopper mounted on the monoaxial extruder. The cyclic olefin resin A3 was melted and the melted cyclic olefin resin A3 was supplied to the multi-manifold die, with the extruder having an outlet temperature of 285° C. and a gear pump revolution of 4 rpm.

Each of the cyclic olefin resin A3 in a melted state, the UV absorber-containing cyclic olefin resin composition J1 in a melted state, and the cyclic olefin resin A3 in a melted state was discharged from the multi-manifold die at 280° C. and cast to a cooling roll controlled at a temperature of 150° C., to obtain an unstretched film (B). In discharging the resins, the air gap was set to 50 mm. As the method for casting the discharged resins to the cooling roll, edge pinning was employed.

The unstretched film (B) was a multi-layer film provided with a resin layer of the cyclic olefin resin A3 having a thickness of 15 μm, a resin layer of the UV absorber-containing cyclic olefin resin composition J1 having a thickness of 40 μm, and a resin layer of the cyclic olefin resin A3 having a thickness of 15 μm, in this order to make a 3-layer structure. The total thickness of the unstretched film (B) was 70 μm.

The unstretched film (B) was supplied to a tenter stretching machine and obliquely stretched at a stretching ratio of 1.5 and at a stretching temperature of 140° C. by the tenter stretching machine to obtain a stretched film. The stretched film obtained was a multi-layer film with a total thickness of 47 μm, having a three-layer structure provided with a first surface layer of the cyclic olefin resin A3 having a thickness of 8 μm, an intermediate layer of the UV absorber-containing cyclic olefin resin composition J1 having a thickness of 31 μm, and a second surface layer of the cyclic olefin resin A3 having a thickness of 8 μm, in this order. The multi-layer film had an in-plane retardation Re of 100 nm and a light transmittance of 0.02% at a measurement wavelength of 380 nm.

A laminate film having a cured film was prepared in the same procedure as in Example 1 except that the multi-layer film obtained was used as the substrate film.

Example 10

A polarizer ("HLC2-5618S" manufactured by Sanritz Corporation) was prepared. One surface of the polarizer was laminated on the substrate film side surface of the laminate film prepared in Example 8 via a UV-curable acrylic adhesive, so that a polarizer was prepared. The laminate film was laminated on the polarizer such that the slow phase axis of the substrate film was set at an angle of 45° to the transmission axis of the polarizer.

A commercially available cellular phone (NTT DOCOMO F-09A) having an IPS-mode liquid crystal panel was dismantled to remove a polarizing plate on the viewing side. Instead of the removed polarizing plate on the viewing side, the polarizing plate prepared was disposed to assemble a liquid crystal display device, with the cured film of the laminate film on the viewing side. In the observation of the white display on the image display surface of the liquid crystal display device thus obtained through polarizing sunglasses, the visibility of the image was consistent even when the viewing direction was tilted from about 45° to 90°. When the outermost surface of the cured film was scratched with a pencil with a hardness of HB, no scratch was visually observed.

The evaluation results are shown in Table 1. In the table, "ZNR" means the film of a norbornene derivative polymer, and "TOPAS" means the film of a copolymer of norbornene and ethylene. As a reference example, the results of a single cyclic olefin resin film used in Example 4 are shown.

TABLE 1

| Item | | Ex. 1 | Ex. 2 | Ex. 3 | Ex. 4 | Ex. 5 |
|---|---|---|---|---|---|---|
| Substrate film | Type | ZNR un-stretched | ZNR un-stretched | ZNR un-stretched | TOPAS un-stretched | ZNR un-stretched |
| | In-plane Re [nm] | 3 | 3 | 1 | 5 | 3 |
| | Thickness [μm] | 100 | 100 | 35 | 100 | 100 |
| | Glass transition temperature (Tg) [° C.] (Tg of intermediate layer for multi-layer films) | 163 | 136 | 163 | 170 | 163 |
| | Tg of surface layer resin [° C.] | — | — | — | — | — |
| Curable composition | (1) Double bond equivalent | 228 | 228 | 228 | 228 | 228 |
| | Amount of fine particles 1 added [part by mass] | 40 | 40 | 40 | 40 | 40 |

TABLE 1-continued

|  |  |  |  |  |  |  |
|---|---|---|---|---|---|---|
|  | Amount of fine particles 2 added [part by mass] | 0 | 0 | 0 | 0 | 0 |
| Irradiation light intensity [mJ/cm$^2$] |  | 400 | 400 | 400 | 400 | 400 |
| Film of curable composition (cured film) | Thickness [μm] | 2.5 | 2.5 | 2.5 | 2.5 | 1.5 |
|  | (7) Ra of surface [nm] | 0.6 | 0.5 | 0.6 | 0.7 | 0.6 |
|  | (8) Pencil hardness | HB | HB | B | HB | HB |
| Laminate film | (2) Scratch resistance [gf] | 200 | 200 | 200 | 200 | 150 |
|  | (3) Flexibility: number of cracked spots | 0 | 0 | 0 | 0 | 0 |
|  | (4) Adhesion [%] | 100 | 100 | 100 | 100 | 100 |
|  | (5) Slidability [gf] | <50 | <50 | <50 | <50 | <50 |
|  | (6) Overall evaluation | Good | Good | Good | Good | Fair |

| Item |  | Ex. 6 | Ex. 7 | Ex. 8 | Ex. 9 | Ref. Ex. |
|---|---|---|---|---|---|---|
| Substrate film | Type | ZNR un-stretched | ZNR un-stretched | ZNR stretched | ZNR multi-layer stretched | TOPAS un-stretched |
|  | In-plane Re [nm] | 3 | 3 | 130 | 100 | 5 |
|  | Thickness [μm] | 100 | 100 | 47 | 47 | 100 |
|  | Glass transition temperature (Tg) [° C.] (Tg of intermediate layer for multi-layer films) | 163 | 163 | 126 | 118 | 170 |
|  | Tg of surface layer resin [° C.] | — | — | — | 126 | — |
| Curable composition | (1) Double bond equivalent | 228 | 228 | 228 | 228 | — |
|  | Amount of fine particles 1 added [part by mass] | 40 | 40 | 40 | 40 | — |
|  | Amount of fine particles 2 added [part by mass] | 30 | 25 | 0 | 0 | — |
| Irradiation light intensity [mJ/cm$^2$] |  | 400 | 400 | 400 | 400 | — |
| Film of curable composition (cured film) | Thickness [μm] | 2.5 | 2.5 | 2.5 | 2.5 | — |
|  | (7) Ra of surface [nm] | 2 | 1.7 | 0.6 | 0.7 | — |
|  | (8) Pencil hardness | HB | HB | B | B | — |
| Laminate film | (2) Scratch resistance [gf] | 150 | 150 | 200 | 200 | 50> |
|  | (3) Flexibility: number of cracked spots | 0 | 0 | 0 | 0 | 7 |
|  | (4) Adhesion [%] | 100 | 100 | 100 | 100 | — |
|  | (5) Slidability [gf] | >200 | >200 | <50 | <50 | <50 |
|  | (6) Overall evaluation | Good | Good | Good | Good | Poor |

As shown in Table 1, it was confirmed that the laminate film of the present invention had excellent scratch resistance and flexibility with favorable adhesion between a substrate film and a cured film, while having a cyclic olefin resin film as the substrate film.

REFERENCE SIGNS LIST

1: Laminate film, 3: Cured film, 5: Liquid crystal cell, 7: Polarizer, 10: Substrate film, 11: First surface layer, 12: Second surface layer, 15: Intermediate layer, 20: Liquid crystal display device

The invention claimed is:
1. A laminate film comprising:
 a substrate film; and
 a cured film that is a cured curable composition disposed on one surface or both surfaces of the substrate film, wherein
 the substrate film is a film comprising a cyclic olefin resin; and
 the curable resin composition comprises:
 (A) an acrylic resin having a polymerizable double bond;
 (B) a multifunctional polymerizable compound having three or more polymerizable double bonds, and having one or more monovalent groups represented by the following formula (2-1) or (2-2) as a group containing the polymerizable double bond; and

(C) an alkylene oxide modified bisphenol A di(meth) acrylate represented by the following formula (3), (2-1)

wherein $R^1$ represents a hydrogen atom or a methyl group, d represents an integer of 2 to 4, and e represents an integer of 1 to 6;

wherein $R^1$ represents a hydrogen atom or a methyl group, m is 5, and n represents an integer of 1 to 4;

wherein $R^1$ represents a hydrogen atom or a methyl group, f represents an integer of 2 to 5, g and h represent an integer of 1 or more, and g+h is 2 to 40;

a double bond equivalent of the multifunctional polymerizable compound is 130 or more and 500 or less when the double bond equivalent is defined by a formula: double bond equivalent=molecular weight/number of polymerizable double bonds in the same molecule;

the multifunctional polymerizable compound is a compound different from the acrylic resin;

the arithmetic average roughness of the surface of the cured film is 0.1 μm or less; and wherein the acrylic resin is present in a ratio of 8 parts by mass or more and 40 parts by mass or less; the multifunctional polymerizable compound in a ratio of 40 parts by mass or more and 80 parts by mass or less; and the alkylene oxide modified bisphenol A di(meth) acrylate in a ratio of 4 parts by mass or more and 40 parts by mass or less.

2. The laminate film according to claim 1, wherein the double bond equivalent of the acrylic resin is 220 or more and 2500 or less.

3. The laminate film according to claim 1, wherein a weight average molecular weight of the acrylic resin is 5000 or more and 200,000 or less.

4. The laminate film according to claim 1, wherein the double bond equivalent of the multifunctional polymerizable compound is 130 or more and 300 less.

5. The laminate film according to claim 1, wherein fin the formula (3) is 2.

6. The laminate film according to claim 1, wherein the curable composition further comprises (D) a urethane (meth) acrylate having a urethane group and two or more (meth) acryloyl groups.

7. The laminate film according to claim 1, wherein the curable composition comprises (D) a urethane (meth)acrylate having a urethane group and two or more (meth)acryloyl groups in a ratio of 0.5 parts by mass or more and 15 parts by mass or less.

8. The laminate film according to claim 1, wherein the curable composition further comprises (E) a photopolymerization initiator.

9. The laminate film according to claim 1, wherein the curable composition further comprises (F) fine particles.

10. The laminate film according to claim 1, wherein a glass transition temperature of the cyclic olefin resin is 100° C. or higher and 180° C. or lower.

11. The laminate film according to claim 1, wherein the substrate film is a stretched film.

12. The laminate film according to claim 11, wherein the stretched film is an obliquely stretched film.

13. The laminate film according to claim 1, wherein the substrate film is a multi-layer film.

14. The laminate film according to claim 13, wherein the multi-layer film comprises a first surface layer, an intermediate layer, and a second surface layer, wherein the first surface layer, the intermediate layer, and the second surface layer are stacked in this order, the intermediate layer contains a UV absorber, and a thickness of the multi-layer film is a 10 μm or more and 100 μm or less.

15. A liquid crystal display device comprising: a liquid crystal cell; a polarizer; and the laminate film according to claim 1, wherein
the polarizer and the laminate film are stacked on a viewing side of the liquid crystal cell in this order, and
the laminate film is stacked such that the substrate film and the cured film are disposed in this order from the liquid crystal cell side.

16. The liquid crystal display device according to claim 15, wherein the liquid crystal cell is an IPS-mode liquid crystal cell.

* * * * *